United States Patent
Ting et al.

[11] Patent Number: 5,874,633
[45] Date of Patent: *Feb. 23, 1999

[54] CONCENTRATED SINGLE PHASE AQUEOUS SOLUTIONS OF TETRAHYDROISO-α-ACIDS AND METHODS OF PREPARING THE SAME

[75] Inventors: Patrick L. Ting; Henry Goldstein, both of Brookfield, Wis.

[73] Assignee: Miller Brewing Company, Milwaukee, Wis.

[ * ] Notice: The term of this patent shall not extend beyond the expiration date of Pat. No. 5,523,489.

[21] Appl. No.: 739,910

[22] Filed: Oct. 30, 1996

[51] Int. Cl.$^6$ .............................. C07C 45/62; C07C 45/67
[52] U.S. Cl. ......................... 568/347; 568/377; 568/350; 426/600; 426/422
[58] Field of Search .................................... 426/600, 422; 568/347, 377, 350

[56] References Cited

U.S. PATENT DOCUMENTS

| | | | |
|---|---|---|---|
| 3,765,903 | 10/1973 | Clarke et al. | 99/50.5 |
| 4,666,731 | 5/1987 | Todd, Jr. | 426/600 |
| 5,013,571 | 5/1991 | Hay | 426/600 |
| 5,200,227 | 4/1993 | Guzinski et al. | 426/600 |
| 5,296,637 | 3/1994 | Stegink et al. | 568/341 |
| 5,523,489 | 6/1996 | Ting et al. | 568/347 |

FOREIGN PATENT DOCUMENTS

WO 96/31593  10/1996  WIPO ............................... C12C 3/00

*Primary Examiner*—Paula K. Hutzell
*Assistant Examiner*—Khalid Masood
*Attorney, Agent, or Firm*—Quarles & Brady

[57] ABSTRACT

A concentrated single phase aqueous alkaline solution of tetrahydroiso-α-acids having greater than 10% to about 45% w/w tetrahydroiso-α-acids is disclosed. A method of hydrogenating and formulating a starting solution of iso-α-acids to obtain such concentrated solutions of tetrahydroiso-α-acids is also disclosed.

25 Claims, No Drawings

1

CONCENTRATED SINGLE PHASE AQUEOUS SOLUTIONS OF TETRAHYDROISO-α-ACIDS AND METHODS OF PREPARING THE SAME

FIELD OF THE INVENTION

The present invention relates to bittering agents for flavoring beer and other beverages. More particularly, it relates to a method of preparing concentrated aqueous solutions of tetrahydroiso-α-acids which can be added to beer and other brewing streams.

DESCRIPTION OF THE PRIOR ART

Tetrahydroiso-α-acids are light-stable FDA-approved bittering agents which can be used to add a hop flavor to beer. They can be prepared from the β-acids (or lupulones) in hop extracts. The hop extracts also contain α-acids (or humulones) which also can be used to make tetrahydroiso-α-acids.

In the Cowles, et al., U.S. Pat. No. 4,644,084 a process is disclosed for making tetrahydroiso-α-acids by treating β-acids to form desoxytetrahydro-α-acids which are dissolved in an aqueous alcoholic caustic solution and then oxidized with an oxygen-containing gas in the presence of metallic ions to form the desired tetrahydroiso-α-acids. The process of Cowles, et al. patent does not use undesirable organic solvents and is superior to other known processes using β-acids.

In the Hay U.S. Pat. No. 5,013,571 a process is disclosed for simultaneously isomerizing and reducing α-acids to tetrahydroiso-α-acids (THIAA). And another process is disclosed for reducing iso-α-acids to THIAA. The Hay process uses relatively high pHs (8 to 10), significant amounts of water, and hydrogen pressures above about 50 psig. A relatively long reaction time and high temperature are required. As a result, side reactions can take place that can result in undesired products. Furthermore, the desired tetrahydroiso-α-acids are not easily isolated from the Hay reaction mixture.

In the Ting, et al., U.S. Pat. No. 5,523,489 a process is disclosed of reducing iso-α-acids to tetrahydroiso-α-acids in an acidic ethanol solution.

All the above processes result in tetrahydroiso-α-acids in the acidic form. These forms are not suitable for post-kettle or post-fermentation (or direct addition) addition to beer and beverages due to their extremely low solubility. The post-kettle or post-fermentation addition (or direct addition) can improve both the control of the flavor and the efficiency with which the hops are converted into bitter acids. In practice, much effort and expense are put into the formulation of tetrahydroiso-α-acids to a maximum 10% (w/w) concentration in an aqueous alkaline solution so that it can be directly added to beer streams.

Iso-α-acids are also known as bittering agents. However, iso-α-acids are not light stable and, therefore, cannot be used to treat beer where light stability is required. Commercially, iso-α-acids are available as a 35% w/w aqueous potassium hydroxide solution or other iso-α-acid solution. These commercial solutions can be used as is or diluted with water to form 1%/2% solutions prior to the addition to beer.

If one desires a light stable beer, tetrahydroiso-α-acids must be used. Tetrahydroiso-α-acid aqueous solutions are only available commercially up to 10% w/w concentration due to their low solubility. Thus, manufacturing, shipping, and storage costs for this bittering agent can be appreciable when compared to 35% w/w aqueous solutions of iso-α-acids.

Guzinski, et al., U.S. Pat. No. 5,200,227, disclose that up to a 15% w/w tetrahydroiso-α-acid solution may be made by blending it with other types of bittering agents such as hexahydroiso-α-acids, dihydroiso-α-acids, or iso-α-acids. The drawback of this approach is that these other iso-α-acids are either unstable to light or are less bitter than tetrahydroiso-α-acids. The preparation is also complicated. Thus, a need exists for a concentrated solution of tetrahydroiso-α-acids which is economical to make, use, store, and transport.

SUMMARY OF THE INVENTION

We have discovered a method of preparing a concentrated single phase aqueous solution of tetrahydroiso-α-acids without using propylene glycol, glycerol, sugar, ethanol, etc. as a supplement. The concentrated solution of the present invention is economical to manufacture, store, and transport.

The invention provides a commercially viable method of directly preparing a single phase aqueous alkaline solution of tetrahydroiso-α-acids, comprising the steps of: dissolving an aqueous alkaline solution of iso-α-acids in a lower alkanol solvent, wherein the alkaline solution is about 10% to about 45% w/w iso-α-acids; reducing the iso-α-acids in the presence of about 1–2000 psig of hydrogen and a palladium on carbon catalyst at about 20°–100° C. to form tetrahydroiso-α-acids; filtering the solution to remove the catalyst; and removing the alkanol solvent to form the single phase aqueous solution having greater than 10% to about 45% w/w tetrahydroiso-α-acids. Preferably, the lower alkanol is ethanol.

The temperature of the hydrogenation reaction should preferably be about 200°–500° C. and most preferably should be about 40°–45° C. The hydrogen pressure should preferably be 1–50 psig and most preferably should be about 20 psig.

Preferably the aqueous alkaline solution of iso-α-acids is about 15%–25% w/w iso-α-acids; more preferably it is 25%–35% w/w iso-α-acids; and most preferably it is about 35%–45% w/w iso-α-acids. Preferably the single phase aqueous alkaline solution of tetrahydroiso-α-acids is about 15%–25% w/w; more preferably it is about 25%–35% w/w; most preferably it is about 35%–45% w/w.

Another aspect of the invention provides a single phase aqueous alkaline solution consisting essentially of greater than 10% to about 45% w/w tetrahydroiso-α-acids. Preferably the tetrahydroiso-α-acids are about 15%–25% w/w; more preferably the tetrahydroiso-α-acids are about 25%–35% w/w; and most preferably the tetrahydroiso-α-acids are about 35%–45% w/w.

A still further aspect of the present invention provides a single phase aqueous alkaline solution of tetrahydroiso-α-acids prepared by the above method.

Yet another aspect of the present invention provides a method of adding flavor to a malt beverage comprising adding single phase aqueous alkaline solutions of tetrahydroiso-α-acids of the above kind at the wort-boiling stage, at the post wort-boiling stage, or at the post-fermentation stage.

The objects of the invention, therefore, include providing a method of preparing single phase aqueous alkaline solutions of tetrahydroiso-α-acids of the above kind which:

(a) provide aqueous solutions which are more concentrated than those currently available;

(b) provide concentrated aqueous tetrahydroiso-α-acids solutions which avoid the use of unstable and/or less bitter iso-α-acids to increase the solubility of tetrahydroiso-α-acids;

(c) provide a concentrated aqueous solution of tetrahydroiso-α-acids which provide significant cost advantages with respect to manufacturing, shipping, and storage;

(d) avoid the prior art steps of acidification, phase separation, and formulation;

(e) provide a method which utilizes mild hydrogenation conditions; and (f) provide a carrier to facilitate the post-kettle or post-fermentation addition of hop aroma agents (hop oil).

These and still other objects and advantages of the present invention will be apparent from the description below. However, this description is only of the preferred embodiments. The claims should, therefore, be looked to in order to assess the whole scope of the invention.

DETAILED DESCRIPTION OF THE INVENTION

A formulated iso-α-acids (35% w/w in aqueous potassium hydroxide solution) or a commercially available iso-α-acids aqueous solution is commonly used for the post-kettle bittering agent for light unstable products. We found that these feed materials are suitable for the purpose of preparing a ready-to-be-used light stable post-kettle bittering agent (tetrahydroiso-α-acids in aqueous potassium hydroxide solution) and a foam enhancer.

In the preferred practice of the present invention, the iso-α-acids are prepared from purified α-acids by a process which comprises dissolving a whole $CO_2$ hop extract, containing the α-acids, β-acids and hop oil, in aqueous alkaline (two volumes of $H_2O$ and one equivalent of KOH or NaOH having pH of about 6 to about 8.7) with stirring at about 50° to about 60° C.; separating the aqueous phase, which contains substantially pure α-acids, from an oily phase, which contains β-acids and hop oil; adding to the aqueous phase, a catalytic amount of a divalent magnesium salt, such as magnesium sulfate; stirring and heating the mixture under reflux for about 30 to about 90 minutes to isomerize the α-acids; cooling the mixture to about 85° C. and adding 50% w/w sulfuric acid with stirring; and when the temperature cools to about 70° C. isolating substantially pure iso-α-acids from the top layer of the two layers which form. The iso-α-acids, can then be formulated into the aqueous solutions above.

By dissolving the iso-α-acids aqueous solution in an appropriate amount of alcohol or an aqueous alcohol, they are subjected to the hydrogenation at 20°–50° C. using a palladium on carbon catalyst under about 20 psig hydrogen pressure to produce the tetrahydroiso-α-acids. After filtering off the catalyst, the filtrate containing high amounts of alcohol and potassium salts of tetrahydroiso-α-acids aqueous mixture is taken up to the desired concentration.

By careful evaporation of all the alcohol, it provides an aqueous potassium hydroxide solution in a pH range of 6–10 containing about 35% concentration (in a range of 20–45% w/w) of tetrahydroiso-α-acids which is suitable for a ready-to-be-used post-kettle bittering agent. The obtained single phase (homogenous) liquid can become a two phase liquid after standing for several days when the temperature is below 28° C., but it is easily reversed by slightly warming up to above 28° C. Interestingly, after phase separation, the top phase is found to contain 18% (w/w) of tetrahydroiso-α-acids and the bottom contains 57% (w/w) of tetrahydroiso-α-acids.

A commercial product called Iso-K (iso-α-acid potassium salt solution which typically contains 30–35% w/w concentration of iso-α-acids; pH 7–9) is readily available for use as a post-kettle bittering agent. Similar types of products are also commercially available. This feed material was evaluated and subjected to the hydrogenation reaction. The hydrogenation of the Iso-K was carried out in aqueous ethanol solution using 5% Pd/C as the catalyst under about 20 psig of hydrogen and at 30°–50° C. for 3 hours. The hydrogenation of iso-α-acids resulted in no over-reduced products.

The catalyst was filtered out from the resulting mixture and the filtrate was concentrated by removing the ethanol by evaporation. However, the filtrate had not been acidified prior to the evaporation in order to keep the tetrahydroiso-α-acids in its potassium salt form. Unexpectedly, after concentration, an aqueous solution product containing 20–45% w/w of tetrahydroiso-α-acid salts was obtained. Its physical behavior is similar to Iso-K and dihydroiso-α-acids solution disclosed in Westermann, U.S. Pat. No. 3,798,332 (a formulated alkaline aqueous solution containing 30–35% of ρ-iso-α-acids). The product oiled out after standing at room temperature (25° C.), but a single phase solution of the product was reformed after warming to 30°–40° C. An extra formulation step is not required and it appears to be suitable to use "as is" for the post-kettle bittering. To our knowledge, no other products have yet been able to achieve this high concentration of tetrahydroiso-α-acids in an aqueous solution.

A schematic of the process of the present invention follows:

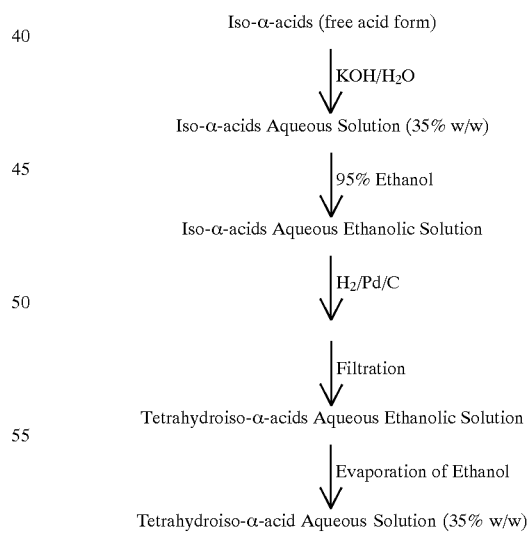

Chemical structures of the process of the present invention are as follows:

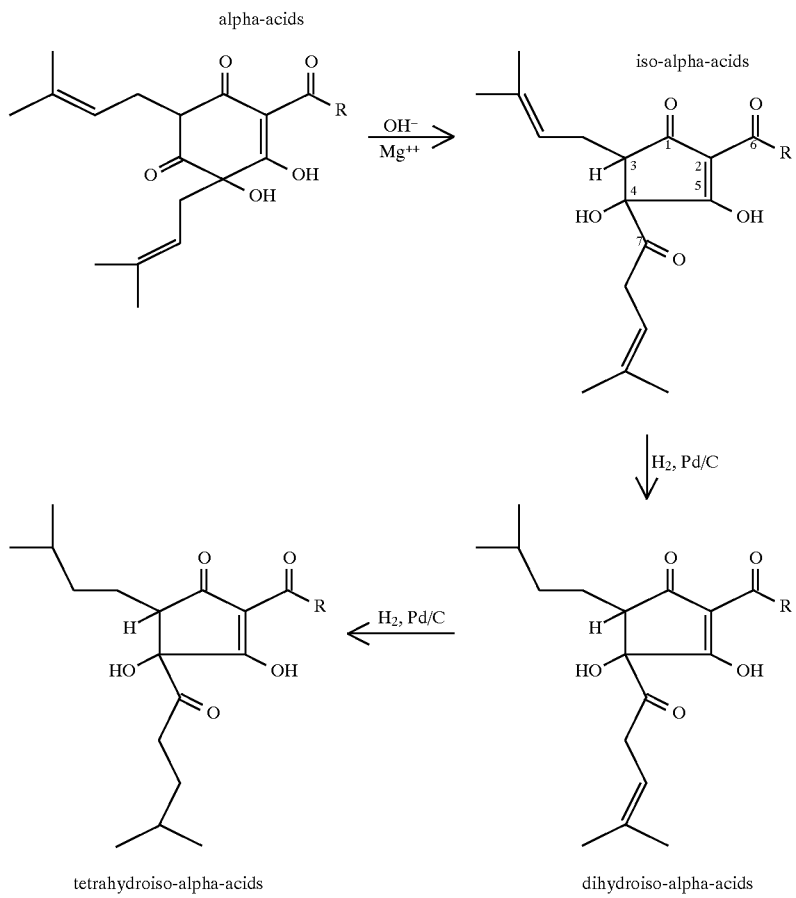

R can be —CH(CH$_3$)$_2$; —CH$_2$CH(CH$_3$)$_2$; or —CHCH$_2$CHCH$_3$.

The practice of the invention is further illustrated by the following examples:

A. Hydrogenation of Formulated Iso-α-acids (Aqueous Iso-α-acids Solution)

EXAMPLE 1

To a one-liter autoclave was added 153 g of an aqueous iso-α-acid solution (containing 32% concentration by weight of iso-α-acids), 250 mL of 95% ethanol, 8 g of 5% Pd/C catalyst and hydrogenated under 20 psig of hydrogen and 20°–50° C. The reaction was completed in 2 hours. After filtering off the catalyst, the filtrate was concentrated by rotaevaporation under 27 mm/Hg vacuum and 30°–40° C. water bath to remove the ethanol. An aqueous solution, 120 g, was obtained and found to contain 33%. of tetrahydroiso-α-acids with 78% yield (analyzed by HPLC).

It will be apparent to those skilled in the art that the method of the present invention for converting iso-α-acids to tetrahydroiso-α-acids avoids the use of objectionable organic solvents and other toxic reagents. The method also employs low pHs and low pressures. Therefore, the likelihood that undesired products will form is reduced. Furthermore, because the tetrahydroiso-α-acids are obtained in a mixture of ethanol with a relatively small amount of water, the isolation of the tetrahydroiso-α-acids is facilitated.

EXAMPLE 2

To a one-liter autoclave was added 300 g of an aqueous iso-α-acid solution (30% concentration by weight), 300 mL of 95% ethanol and 18 g of 5% Pd/C catalyst and the autoclave was charged with hydrogen. The hydrogenation was carried out under 20 psig of hydrogen and 20°–45° C. for 3 hours. After filtering out the catalyst, the filtrate was rotaevaporated to remove the ethanol (about 310 mL) under 27 mm/Hg and 30°–40° C. A single phase aqueous solution was obtained and found to contain 34% concentration of tetrahydroiso-α-acids by weight (86% yield analyzed by HPLC).

It will be apparent to those skilled in the art that the method of the present invention for converting iso-α-acids to tetrahydroiso-α-acids avoids the use of objectionable organic solvents and other toxic reagents. The method also employs low pHs and low pressures. Therefore, the likelihood that undesired products will form is reduced. Furthermore, because the tetrahydroiso-α-acids are obtained in a mixture of ethanol with a relatively small amount of water, the isolation of the tetrahydroiso-α-acids is facilitated.

It is intended that the invention not be limited by the foregoing description, but only by the claims which follow.

We claim:

1. A method of preparing a single phase aqueous alkaline solution consisting essentially of tetrahydroiso-α-acids, comprising the steps of:

dissolving an aqueous alkaline solution of iso-α-acids of the formula

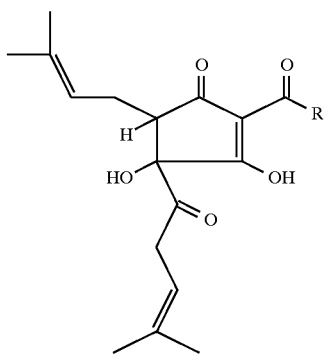

in a lower alkanol solvent, wherein the alkaline solution is about 10% to about 45% w/w iso-α-acids;
    reducing the iso-α-acids in the presence of about 1–2000 psig of hydrogen and a palladium on carbon catalyst at about 20°–100° C. to form tetrahydroiso-α-acids;
    filtering the solution to remove the catalyst; and
    removing the alkanol solvent to form the single phase aqueous alkaline solution consisting essentially of greater than about 10% to about 45% w/w tetrahydroiso-α-acids of the formula

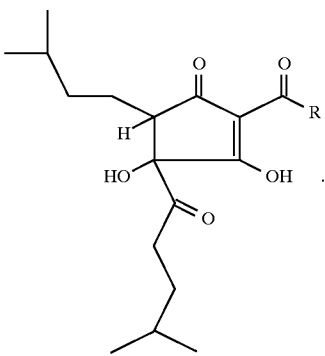

2. The method of claim 1, wherein the temperature is about 20°–50° C.

3. The method of claim 1, wherein the temperature is about 40°–45° C.

4. The method of claim 1, wherein the hydrogen pressure is about 1–50 psig.

5. The method of claim 1, wherein the hydrogen pressure is about 20 psig.

6. The method of claim 1, wherein the lower alkanol is ethanol.

7. The method of claim 1, wherein the alkanol solvent is removed by distillation.

8. The method of claim 1, wherein the alkanol solvent is removed by evaporation.

9. The method of claim 1, wherein the single phase aqueous alkaline solution is about 15%–25% w/w tetrahydroiso-α-acids.

10. The method of claim 1, wherein the single phase aqueous alkaline solution is about 25%–35% w/w tetrahydroiso-α-acids.

11. The method of claim 1, wherein the single phase aqueous alkaline solution is about 35%–45% w/w tetrahydroiso-α-acids.

12. The method of claim 1, wherein the aqueous alkaline solution of iso-α-acids has a pH of about 6–10.

13. The method of claim 12, wherein the aqueous alkaline solution of iso-α-acids has a pH of about 8–9.

14. The method of claim 12, wherein the aqueous alkaline solution of tetrahydroiso-α-acids has a pH of about 6–10.

15. The method of claim 14, wherein the aqueous alkaline solution of tetrahydroiso-α-acids has a pH of about 8–9.

16. The method of claim 1, wherein the aqueous alkaline solution of iso-α-acids is a potassium hydroxide solution.

17. The method of claim 1, wherein the aqueous alkaline solution of tetrahydroiso-α-acids is a potassium hydroxide solution.

18. A single-phase aqueous alkaline solution consisting essentially of greater than 10% to about 45% w/w tetrahydrosio-α-acids of the formula

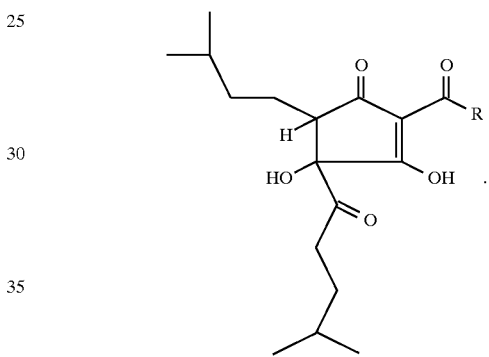

19. The solution of claim 18, wherein the solution has a pH of about 6–10.

20. The solution of claim 19, wherein the solution has a pH of about 8–9.

21. The solution of claim 18, wherein the tetrahydroiso-α-acids are about 15%–25% w/w.

22. The solution of claim 18, wherein the tetrahydroiso-α-acids are about 25%–35% w/w.

23. The solution of claim 18, wherein the tetrahydroiso-α-acids are about 35%–45% w/w.

24. The solution of claim 18, wherein the solution is an aqueous potassium hydroxide solution.

25. A single-phase aqueous alkaline solution consisting essentially of tetrahydroiso-α-acids prepared by the method of claim 1.

* * * * *

UNITED STATES PATENT AND TRADEMARK OFFICE
CERTIFICATE OF CORRECTION

PATENT NO.  : 5,874,633

DATED  : February 23, 1999

INVENTOR(S)  : Patrick L. Ting, et al.

It is certified that error appears in the above-identified patent and that said Letters Patent is hereby corrected as shown below:

At Column 2, Line 33:

Delete "200°-500°C", insert --20°-50°C--

Signed and Sealed this

Twenty-first Day of September, 1999

Attest:

Q. TODD DICKINSON

Attesting Officer     Acting Commissioner of Patents and Trademarks